United States Patent [19]
Kirschner

[11] 3,843,188
[45] Oct. 22, 1974

[54] ROTATIONAL VIBRATION DAMPENING ASSEMBLY

[75] Inventor: Francis Kirschner, East Hills, N.Y.

[73] Assignee: The Soundcoat Co., Inc., Brooklyn, N.Y.

[22] Filed: Jan. 11, 1973

[21] Appl. No.: 322,885

[52] U.S. Cl............... 295/7, 74/432, 74/443, 188/1 B, 295/6, 295/25, 301/6 WB
[51] Int. Cl..... B60b 7/04, B60b 17/00, F16h 55/14
[58] Field of Search....... 74/443, 432; 180/64, 70 P; 188/1 B; 295/6, 7, 25; 301/5 B, 5 BA, 6 WB

[56] References Cited
UNITED STATES PATENTS

| | | | |
|---|---|---|---|
| 1,622,469 | 3/1927 | Scott | 295/7 |
| 1,765,477 | 6/1930 | Ackerman | 295/7 |
| 2,024,375 | 12/1935 | Latsham | 295/7 |
| 2,091,602 | 8/1937 | Le Jeune | 301/6 WB |
| 2,267,311 | 12/1941 | Smith | 295/7 |
| 2,605,132 | 7/1952 | Watter | 295/7 |
| 2,643,152 | 6/1953 | Brauer | 295/7 |
| 2,869,388 | 1/1959 | Kreis | 74/443 |
| 3,377,097 | 4/1968 | Swanson | 295/6 X |
| 3,741,025 | 6/1973 | Russell | 74/443 |

OTHER PUBLICATIONS

Yin, Theodore P., "The Control of Vibration and Noise," Scientific American, January 1969, Vol. 220, No. 1, ppgs. 98–106.

Primary Examiner—M. Henson Wood, Jr.
Assistant Examiner—Howard Beltran
Attorney, Agent, or Firm—Cooper, Dunham, Clark, Griffin & Moran

[57] ABSTRACT

A vibration damping assembly particularly suited for damping noise from rotating substrates. The assembly includes a ring of vibration damping material and one or more spokes of such material that extend inwardly from the ring.

6 Claims, 7 Drawing Figures

PATENTED OCT 22 1974  3,843,188
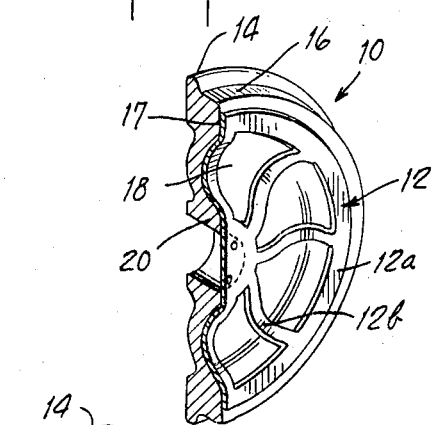
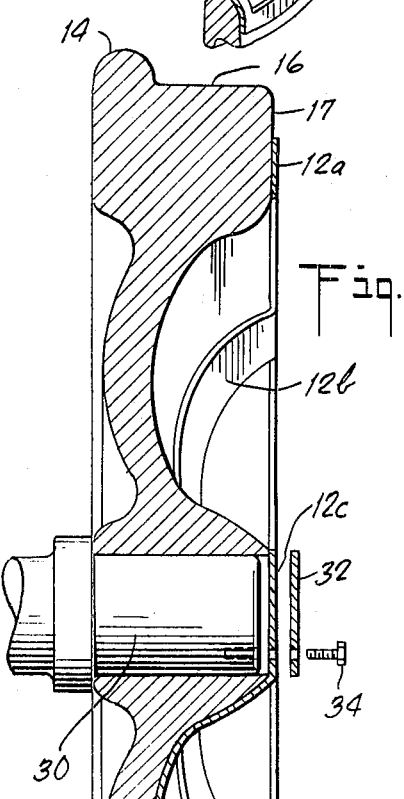
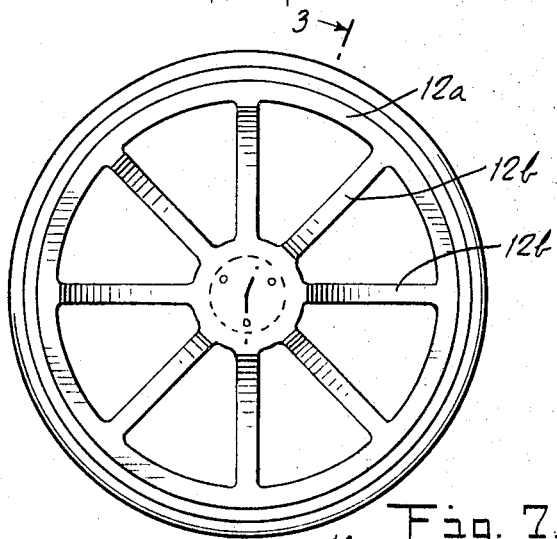
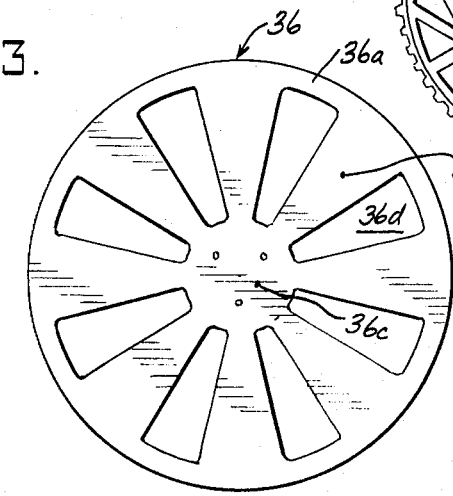
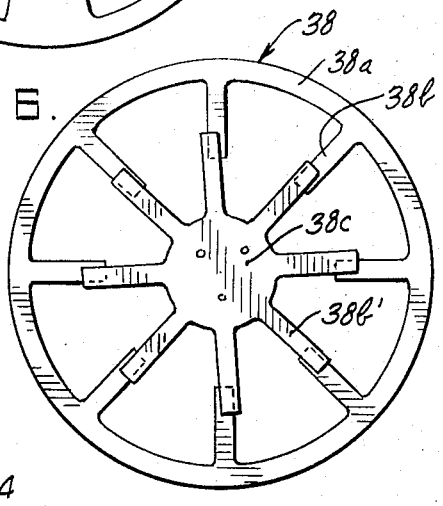
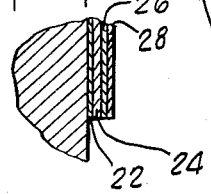
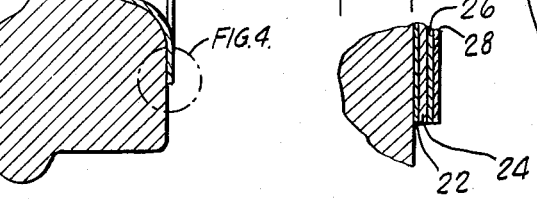

ROTATIONAL VIBRATION DAMPENING ASSEMBLY

BACKGROUND AND BRIEF DESCRIPTION OF THE INVENTION

This invention relates to the damping of vibration and noise and more particularly to the damping of noise from rotating devices. The invention has particular application to the attenuation of screech noise from railroad wheels and the damping of noise from gears.

Assemblies for damping vibration and noise from rotating devices are known. Many involve the use of relatively heavy damping assemblies, which is undesirable from the standpoint of adding an additional load to the rotating device as well as safety. In the copending application Ser. No. 277,715 filed August 3, 1972 for VIBRATION DAMPING ASSEMBLY and assigned to the assignee of the present application, a multi layer vibration damping assembly is disclosed which is relatively light weight and which has excellent sound damping characteristics. As disclosed in that application, a plurality of layers of vibration damping material are employed in which one of the layers, which serves as an adhesive as well as a temperature insulator and a vibration damping medium, is deformed during rotation in tension and compression in a mode transverse to the direction of rotation; a second layer subject to shear deformation is also utilized.

The present invention is directed to an improved vibration damping assembly which improves acoustical performance and further reduces weight. Partial coverage of the rotating substrate rather than virtually complete coverage is employed. The assembly includes a ring of vibration damping material and one or more spokes of such material that extend inwardly from the ring. The ring is adhered to the shoe area of a railroad wheel or to the peripheral area of a gear, for example, and the spokes are adhered to the inner web area. In this fashion, vibration damping material is applied by the ring at the point where the largest vibrations are experienced. The spokes provide damping for the lesser vibrations that occur in the inner web area of the railroad wheel or gear. The spokes may terminate in a central disk, which is bolted to the shaft of the railroad wheel or gear, for example, for additional safety. The spokes are made overlapping or telescoping in order to vary the length thereof.

The following references are of interest:

| U.S. PAT. NO. | INVENTOR | DATE OF ISSUE |
| --- | --- | --- |
| 2,024,375 | E. Latshaw | Dec. 17, 1935 |
| 2,267,311 | J. F. D. Smith | Dec. 23, 1941 |
| 2,605,132 | M. Watter | July 29, 1952 |
| 3,377,097 | R. C. Swanson | Apr. 9, 1968 |

PUBLICATIONS:

"The Control of Vibration and Noise" by Theodore P. Yin, Scientific American — January 1969, Vol. 220, No. 1, ppgs. 98–106.

"Control of Railroad Wheel Screech Noise" by Francis Kirschner Proceedings of the 6th International Congress on Acoustics, Tokyo, Japan, August 21–28, 1968.

"New Developments in the Control of Railroad Screech Noise" by Francis Kirschner, Inter-Noise 72 Proceedings, Washington, D.C., October 4–6, 1972.

The invention will be more completely understood by reference to the following detailed description of representative embodiments thereof.

BRIEF DESCRIPTION OF THE DRAWING

FIG. 1 is a perspective view of a railroad wheel that includes a vibration damping assembly.

FIG. 2 is a plan view of the wheel of FIG. 1 (to an enlarged scale).

FIG. 3 is a sectional view of the wheel of FIG. 2 (to an enlarged scale), taken along the section 3—3 in FIG. 2.

FIG. 4 is a sectional view of a part of the vibration damping assembly shown in FIG. 3 (to an enlarged scale).

FIG. 5 is a plan view of vibration damping material.

FIG. 6 is a plan view of another form of vibration damping assembly in accordance with the invention.

FIG. 7 is a perspective view of a gear.

DETAILED DESCRIPTION

Referring to FIG. 1, a railroad wheel 10 is shown that has affixed thereto a vibration damping assembly 12. The wheel includes a flange portion 14, a rim portion 16, a shoe portion 17, a web portion 18 and a hub portion 20.

The wheel and the vibration damping assembly are shown in more detail in FIGS. 2–4. As shown particularly in FIG. 4, and as disclosed in the copending application Ser. No. 277,715 referred to above, the vibration damping assembly 12 may advantageously consist essentially of four layers, although the present invention is not limited to a multi-layered assembly. The first or innermost layer 22 is typically comprised of a 100 percent solid epoxy resin with a mixture of inorganic fillers. An example of such a resin is "Epoxy 10" a product made by The Soundcoat Company, Inc., 175 Pearl Street, Brooklyn, New York 11201. The layer 22 has three functions. First it serves as an adhesive bonding the layer 24 to the substrate (in this case the wheel 10). The layer 22 also serves as a temperature insulating medium. Finally it serves as a vibration damping material itself. In this case the vibration damping is brought about by deformation of the layer 22 during rotation of the wheel, suce deformation being in tension and compression in a mode transverse to the direction of rotation of the wheel.

The second layer 24 may typically comprise a urethane elastomer, such as "Dyad" also made by The Soundcoat Company, Inc. The second layer is a viscoelastic material which is subject to shear deformation during rotation of the wheel.

The layer 26 is an adhesive, typically a flexible epoxy adhesive, which serves to bond the outer layer 28 to the layer 24.

The outer layer 28 may be of any rigid material, such as a metal. Aluminum has been employed satisfactorily as the outer layer of the vibration damping assembly. Plastic materials may also be employed. This outer layer serves as a constraint to enable the shear deformation of the layer 24. The outer layer 28 also serves as a protective layer, protecting the layers thereunder against physical deterioration.

As shown in FIGS. 1–3, the vibration damping assembly 12 is applied to the wheel in the form of a ring 12a and one or more spokes 12b that extend inwardly from the ring. The spokes terminate in a central disk 12c. The ring 12a is adhered to the so-called shoe area of the railroad wheel. It is this area which experiences the largest vibrations and, accordingly, which should be provided with the greatest amount of damping. For the relatively little damping required in the web area 18 of the wheel, partial coverage of that area by one or more spokes 12b of vibration damping material is provided. These spokes aid in securing the damping material to the wheel. As noted above, the spokes terminate in a central disk 12c. The disk may be used to bolt the damping assembly to shaft 30 of the wheel, as shown in FIG. 3, through the use of cover plate 32 and bolts 34.

The exact shape of the damping assembly may take different forms. One such form is shown in FIGS. 1–3. Another form is shown in FIG. 5. The damping assembly may be multi-layered as disclosed in the co-pending application Ser. No. 277,715, referred to above, although as noted above, the present invention is not limited to a multi-layered assembly. The assembly, designated 36 in FIG. 5, includes a ring portion 36a, spoke portions 36b and a central disk 36c. The spoke portions 36b are formed by the cutting away of material (the cut-out portions are designated 36d).

Still another damping assembly is shown in FIG. 6. The assembly, designated 38, includes a ring portion 38a and spoke portions 38b. In this case, central disk portion 36c is joined to spokes 38b' which overlap the spokes 38b. In FIG. 6, the spokes 38b and 38b' are shown somewhat offset from each other (in an arcuate sense) to clearly illustrate the fact that the damping assembly includes individual spoke portions which overlap or telescope with each other. By the overlapping, different effective spoke lengths may be employed so that the same damping assembly may be utilized on differently shaped wheels.

The vibration damping assembly involving ring and spokes may be applied to the inside face of the wheel, rather than the outside as disclosed above, in which case the spokes would be secured to the inside web portion of the wheel and a central disk would not be included.

As disclosed in the copending application Ser. No. 277,715, vibration damping assemblies may be employed which weigh only about 10 pounds, for example, as compared with other railroad wheel vibration damping assemblies used in the past weighing more than 50 pounds. In the case of the present invention, involving a ring and one or more spokes of vibration damping material, the weight of the vibration damping assembly is even less than 10 pounds. Hence the present invention involves the addition of a vibration damping assembly that is less than about 2 percent by weight of the railroad wheel (for example 450 pounds) to which it is added. Such a minor addition in weight results in as much as a 20 decibels noise reduction, for example, which is highly desirable.

The invention also has particular application to the damping of noise from gears. FIG. 7 shows a typical gear 40. A vibration damping assembly 42 is applied to the gear in the same fashion as described above in connection with the representative railroad wheel 10. In particular, the damping assembly 42 includes a ring-shaped portion 42a that is adhered to the outer, peripheral area 40a of the gear. Spokes 42b of damping material extend inwardly from the ring 42a and are adhered to the inner or web portion 40b of the gear. The spokes terminate in a central disk shaped portion 42c of damping material adhered to the central portion of the gear.

While the vibration damping assembly has been shown in its particular application to railroad wheels and gears, it is useful for any rotating device, such as saw blades, cutting tools, pulleys, motor rotors, fans and the like. The vibration damping assembly is useful for the damping of sound in any rotating member which is friction excited, resonant or impact excited to result in the generation of sound.

The invention has been described above in terms of representative, presently preferred embodiments. Those embodiments are subject to modification. For example, the shapes of ring and spokes may vary considerably from those specifically shown. Accordingly, the invention should be taken to be defined by the following claims.

What is claimed is:

1. An assembly damped to reduce vibrations upon rotation comprising a ring of vibration damping material having spokes extending inwardly from said ring, said ring and spokes being adhered to a surface of a rigid structure that undergoes rotation, each of said spokes being comprised of segments partially overlapping each other, the overlapping one of said segments forming a continuation of the overlapped one of said segments.

2. An assembly according to claim 1 in which said spokes terminate in a central disk adhered to said surface of said rigid structure.

3. A railroad wheel assembly having an outer peripheral shoe area and an inner web area, and a wheel-driving shaft, damped to reduce vibrations upon rotation, comprising a ring of vibration damping material adhered to the outer peripheral shoe area of the wheel, a first set of spokes of vibration damping material extending inwardly from said ring and adhered to said inner web area, and a second set of spokes partially overlapping the first set of spokes and adhered to said inner web area and extending toward said shaft.

4. A railroad wheel assembly according to claim 3 in which said second set of spokes terminate in a central disk secured to said shaft.

5. A gear having an outer peripheral area, an inner area and a central area, damped to reduce vibrations upon rotation, comprising a ring of vibration damping material adhered to said outer peripheral area of said gear, a first set of spokes of vibration damping material extending inwardly from said ring and adhered to said inner area of said gear, and a second set of spokes partially overlapping the first set of spokes and adhered to said inner area of said gear and extending toward said central area of said gear.

6. A gear according to claim 5 in which said second set of spokes terminate in a central disk secured to said central area of said gear.

* * * * *